April 2, 1968 M. A. LINDEMAN 3,375,699

GREASE TESTING MACHINE

Filed Oct. 15, 1965

INVENTOR.
MYRL A. LINDEMAN
BY
Ronald R. Johnson
ATTORNEY

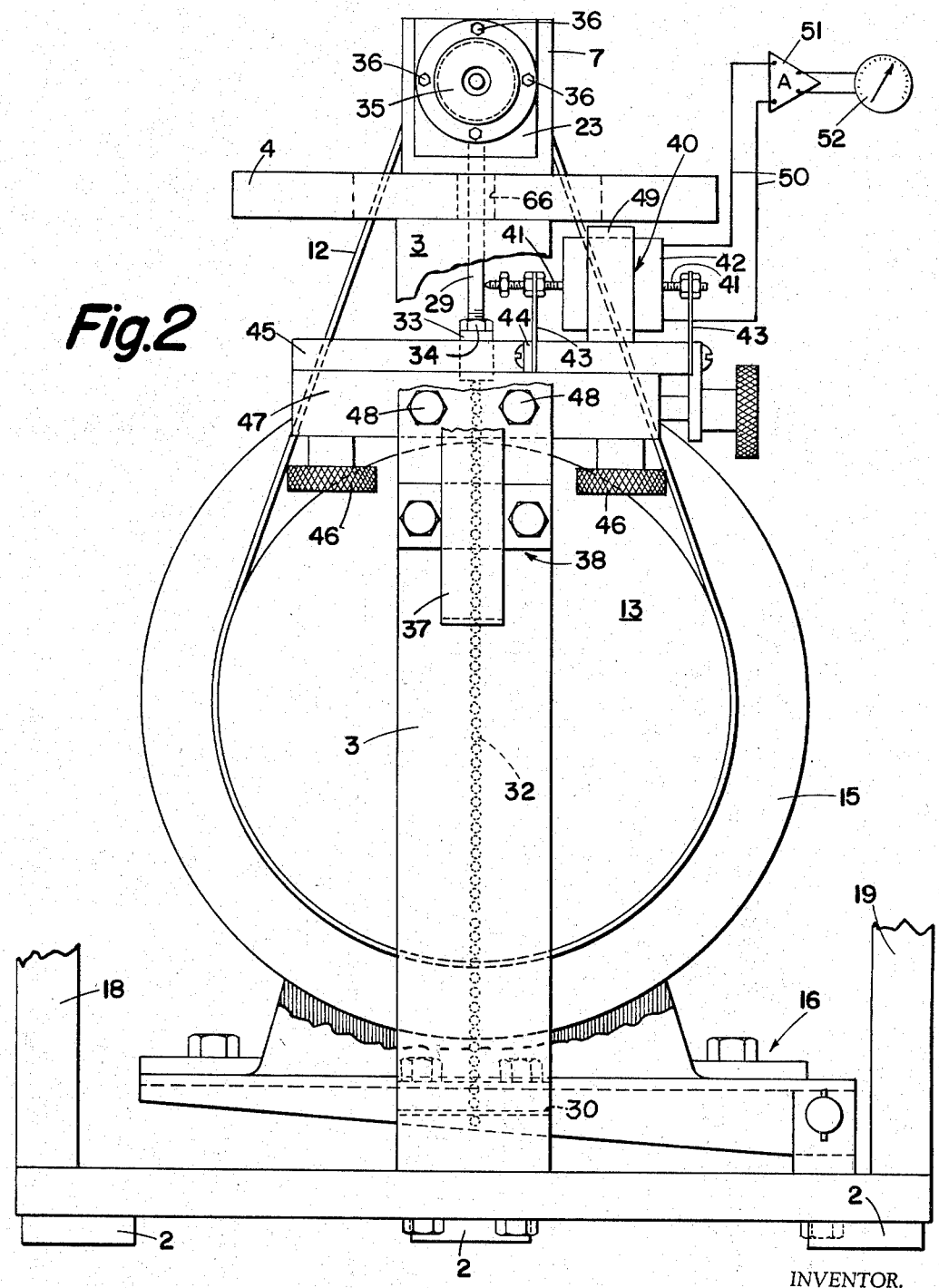

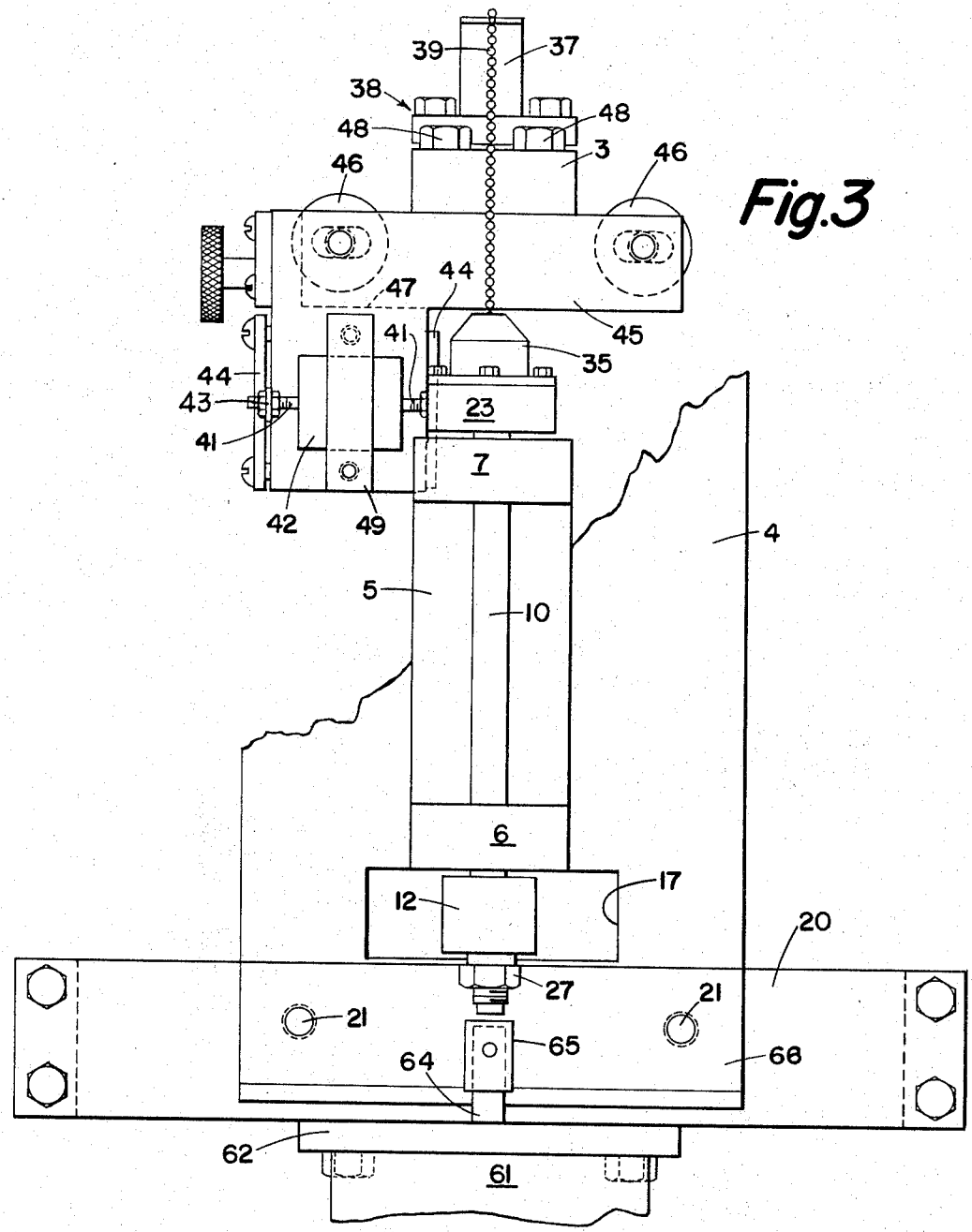

United States Patent Office 3,375,699
Patented Apr. 2, 1968

3,375,699
GREASE TESTING MACHINE
Myrl A. Lindeman, Newton Square, Pa., assignor to Sun Oil Company, Philadelphia, Pa., a corporation of New Jersey
Filed Oct. 15, 1965, Ser. No. 496,587
2 Claims. (Cl. 73—10)

ABSTRACT OF THE DISCLOSURE

In order to test the grease in a ball bearing, the inner race of the bearing is continuously rotated by means of a motor-driven shaft, and the torque developed in the outer race, as a result of viscous drag through the grease, is measured by means of a transducer mechanically coupled to the outer race. Means are provided for applying a fixed but adjustable radial load and/or a fixed but adjustable axial load to the outer race. A heater is provided for heating the bearing during the test.

This invention relates to a machine for testing greases, and more particularly to a machine for testing greases intended for use in small ball bearings.

Very small ball bearings are now being used rather extensively in aerospace equipment. Typical of such ball bearings is that known as an "R–4" bearing, which has a bore (for a shaft supported by the bearing) of ¼-inch, and an O.D. of ⅝-inch. Such ball bearings are customarily packed with grease, for lubrication purposes. The environmental conditions (e.g., the ambient temperature) encountered by aerospace equipment are quite severe. Because of this, and by way of example, it is desired that the ball bearings in such equipment (and also, of course, the grease in such ball bearings) be capable of operating properly over a temperature range of about −65° F. to about 500° F. Testing of the ball bearing grease under varying temperature conditions is highly desirable.

An object of this invention is to provide a novel testing machine, for testing a greased ball bearing under running conditions and at different temperatures.

Another object is to provide a ball bearing grease tester which is capable of measuring the torque exerted on the outer race of a greased ball bearing while the inner race thereof is being rotated.

Still another object is to provide a compact ball bearing grease testing machine, of a size such that it will fit into an environmental test chamber of modest proportions.

Yet another object is to provide a novel ball bearing grease testing machine which can be manipulated to provide axial and/or radial loads on the ball bearing, under running conditions.

A further object is to provide a ball bearing grease tester which is capable of providing an indication of the running torque exerted on the outer race of a greased ball bearing while the inner race thereof is rotating at a very slow or a high rate of speed.

The objects of this invention are accomplished, briefly, in the following manner: A shaft is supported by a suitable base and is journaled for rotation about a substantially horizontal axis. The greased ball bearing to be tested is mounted on one end of this shaft, the inner race of the bearing being firmly secured to the shaft; the outer race of the ball bearing is supported only through the inner race thereof, via the balls. The shaft is arranged to be driven at a high rate of speed by a motor fastened to the base; or, in the alternative (through a releasable clutch arrangement), it can be driven at a very low rate of speed by a separate motor which is also supported by the base. An electromechanical transducer is mechanically coupled to the outer race of the ball bearing, to sense movements thereof and provide a measure of the torque developed in the outer race as the inner race rotates. A cantilever spring is coupled to the ball bearing outer race, to apply a predetermined force in a direction transverse to the axis of the shaft, and another spring applies a predetermined force to the outer race in a direction substantially parallel to the axis of the shaft. A thermocouple is mounted to sense the temperature of the ball bearing outer race.

A detailed description of the invention follows, taken in conjunction with the accompanying drawings, wherein:

FIG. 2 is a side elevation, partly broken away, of the testing machine, on a somewhat larger scale; and FIG. 3 is a partial top or plan view of the machine.

Figure 1:
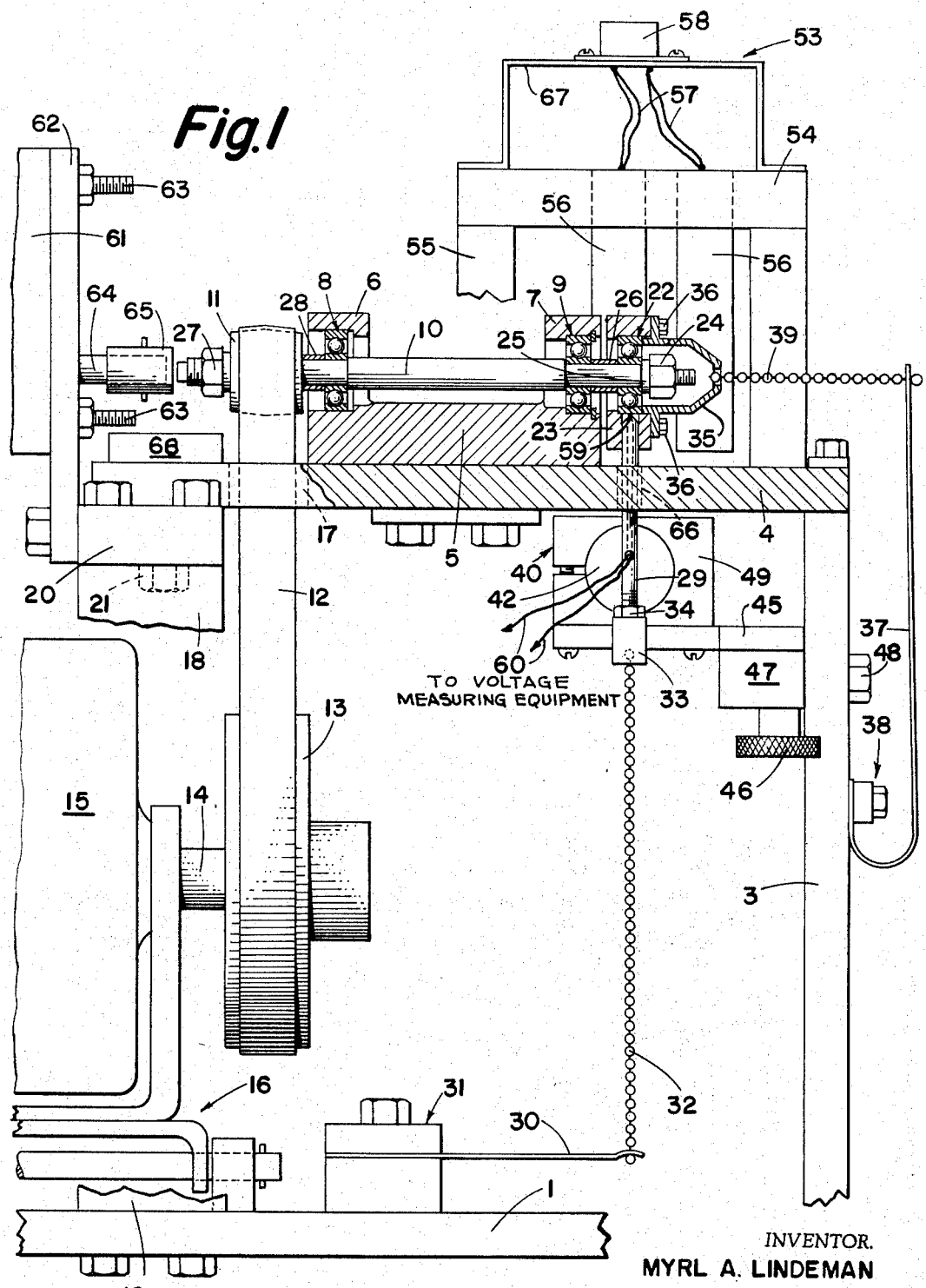
FIG. 1 is a front elevation, partly broken away, of a grease testing machine according to this invention.

Now referring to the drawings, a rectangular plate 1 serves as a supporting base for the machine of this invention. A plurality of rubber feet 2 are secured in any suitable manner to the bottom side of plate 1, at appropriate locations. An upstanding rectangular prismatic column member 3 is bolted at its lower end to plate 1 at one end of the plate and centered along one of its shorter sides. One end of a flat rigid heat insulating mounting plate 4 is bolted to the upper end of column 3, this plate extending substantially horizontally and its major dimension extending parallel to the major dimension of base plate 1. A bearing housing member 5 has a central slab-like portion secured as by bolts to the upper side of plate 4 and has two upstanding bosses 6 and 7 located at its respective ends. The bosses 6 and 7 are hollowed out to serve as housings for mounting the outer races of two respective ball bearings 8 and 9 which function to journal respective opposite ends of a shaft 10 for rotation about a horizontal axis. The inner races of bearings 8 and 9, of course, are firmly secured to shaft 10, and rotate therewith.

In order to rotate shaft 10 at a high rate of speed, e.g. 20,000 r.p.m., a pulley 11 is secured to one end of this shaft, and a drive belt 12 passes over this pulley and also over pulley 13 secured to the output shaft 14 of an electric driving motor 15. Motor 15 is firmly fastened to base plate 1 by means of a hinge-type mounting denoted generally by numeral 16. The belt 12 passes through a rectangular clearance opening 17 cut through plate 4.

A pair of upstanding rectangular prismatic column members 18 and 19 are bolted at their lower ends to plate 1, one at each side edge of the plate 1 and more or less centrally of the longer sides thereof. A rear support bar 20 extends between the column members 18 and 19 and is bolted at its respective opposite ends to the upper ends of these column members. That end of mounting plate 4 which is opposite to the previously-mentioned end thereof is clamped to the top of bar 20 by means of a pair of bolts 21 which pass through bar 20 and plate 4 and then screw into clamp bar 68. Thus, both ends of mounting plate 4 are supported by base plate 1.

The greased bearing 22 to be tested, which preferably is of the same size and type as bearings 8 and 9, is mounted on that end of shaft 10 opposite to pulley 11, and adjacent to bearing 9. The test bearing 22 is housed in a test bearing mount 23 which surrounds shaft 10 and to which the outer race of bearing 22 is secured. The inner races of bearings 9 and 22 are held against shaft 10 by means of a nut 24 which engages threads provided on the end of this shaft and which, by means of a washer 25 bearing against the inner race of bearing 22 and a sleeve 26 between the inner races of bearings 22 and 9, forces the inner race of bearing 9 against a shouldered abutment formed on shaft 10. At the opposite end of shaft 10, a nut 27 engages threads provided at this latter end of the shaft and, by means of a sleeve 28, forces the inner race of bearing 8 against a shouldered abutment formed on the shaft.

The test bearing mount 23 is, as previously stated, secured to the outer race of bearing 22, and this mount is supported only by the shaft 10, through the balls and inner race of bearing 22. Therefore, this mount is free to rotate (at least to a limited extent, being restrained in a manner which will be described later) in response to the torque developed in the outer race of bearing 22, by viscous drag through the grease in this bearing, as the inner race of this bearing rotates along with shaft 10.

A hole is drilled in a radial direction entirely through the lower side of mount 23, into the bore provided in this mount for the bearing 22. The inner end of an elongated tubular torque arm 29 is fixedly secured in this hole, and this torque arm extends downwardly through an aperture 66 in plate 4, the aperture 66 being somewhat elongated in a direction transverse to the axis of shaft 10.

As previously described, the shaft 10 is journaled for rotation about a substantially horizontal axis, and this shaft is driven at a high rate of speed by motor 15, when the latter is energized. The inner race of the test bearing 22 rotates along with shaft 10, and it is desired to measure the "running torque" of the bearing 22, which is the torque developed in the outer race of the test bearing as the inner race thereof rotates with the shaft. It is also desired to measure the "start-up" torque developed in the outer race of the bearing, which is conveniently done when the shaft 10 and the inner race of the bearing are being rotated at a very low rate of speed, such as 1 r.p.m. (by another motor, as will be subsequently described).

In order to sense and measure the torque developed in the outer race of the test bearing 22, an electromechanical transducer of the differential-transformer type, denoted generally by numeral 40, is utilized. This differential transformer includes an elongated cylindrical core of ferromagnetic material mounted on extension screws 41 at each end for movement back and forth in a substantially horizontal direction (transverse to the axis of shaft 10), with respect to several cooperating coils contained in a stationary coil assembly 42. Core and extension screws 41 are secured at opposite ends to the upper ends of two spaced, parallel, vertically-extending cantilever springs 43 whose lower ends are fastened by respective clamping plates 44 to a fixed L-shaped mounting plate 45. Mounting plate 45 is fastened by means of a pair of clamping screws 46 to the upper side of a bracket plate 47 which is bolted at 48 to the column 3. Screws 46 pass through elongated apertures in plate 47 and thread into plate 45, so that the plate 45, and all of the elements carried thereby, may be adjusted in position with respect to plate 47 and column 3. Coil assembly 42 is fixedly secured (by means of a yoke 49) to mounting plate 45.

One end of core and extension screws 41 is positioned to be displaced by torque arm 29. Thus, as torque arm 29 tends to rotate due to the torque developed in the outer race of the test bearing 22 when the inner race of this bearing is rotated (it will be remembered, at this juncture, that arm 29 is secured to mount 23 and the outer race of bearing 22), arm 29 moves core 41 horizontally (against the restoring force of springs 43) to a position dependent upon the amount of torque developed in the outer race of test bearing 22. The small horizontal deflection of core and extension screws 41 (from its normal or at-rest position) which is produced is sensed by the coacting output coil of the differential-transformer coil assembly 42, resulting in a signal on the electromechanical transducer output leads 50. For simplicity, only the output leads of the differential transformer are illustrated; it will be appreciated that excitation leads are also used with the differential transformer, in accordance with the usual practice. The resultant signal on output leads 50 is amplified by amplifier 51 and applied to an indicator (meter) 52 having a pointer cooperating with a calibrated dial indicating units of torque.

By means of the arrangement described, including the electromechanical transducer 40, the torque developed in the outer race of the test bearing 22, as the inner race thereof rotates, may be measured.

In order to radially load the test bearing 22, one end of a substantially horizontally-extending cantilever spring 30, made for example of Phosphor bronze or other suitable resilient material, is rigidly secured as by means of a bolted clamping arrangement 31 to the base plate 1. The lower end of a bead chain 32 is attached to the free end of spring 30 by means of a slot in the latter, and this bead chain, when mounted in the testing machine, extends in a substantially vertical direction. The upper end of bead chain 32 is secured to a slotted bracket 33 in turn secured to an adjusting nut 34 which engages threads provided on the lower end of torque arm 29. It may be seen that the cantilever spring 30, acting through bead chain 32 on the lower end of arm 29, serves to apply a predetermined linear force to the outer race of bearing 22 (through the mount 23) in a direction transverse to the axis of shaft 10; this radially loads the test bearing 22.

A rigid test bearing outer race clamp member 35 has a vertical outwardly-extending annular flange which is bolted by four bolts 36 to the right-hand (vertical) face of mount 23. Member 35 has a sleeve portion which extends inwardly from the aforesaid annular flange and whose inner end engages the outer race of test bearing 22, thereby to clamp the latter in the test mount 23. To the right or outwardly of the aforesaid annular flange, clamp 35 has a bell-shaped section which surrounds but is spaced from nut 24 and the end of shaft 10. In order to axially load the test bearing 22, the lower end of a somewhat U-shaped cantilever spring 37, made of the same material as spring 30, is rigidly secured as by means of a bolted clamping arrangement 38 to the side of column member 3. The free end of spring 37 extends upwardly, more or less vertically from the curved bottom of the U, to a point somewhat above the axis of shaft 10, and its upper end is slotted. One end of a bead chain 39 is attached to the upper end of spring 37 by means of the slot in the latter, and this bead chain, when mounted in the testing machine, extends in a substantially horizontal direction. The other or left-hand end of bead chain 39 is secured to the apex or center of clamp member 35, as by means of a slot or hole provided in the latter. It may be seen that cantilever spring 37, acting through bead chain 39 on the clamp member 35, serves to apply a predetermined linear force to the outer race of bearing 22 (through the mount 23) in a direction substantially parallel to the axis of shaft 10; this axially loads the test bearing 22.

In order to enable testing of the grease in bearing 22 (and the bearing itself) at elevated temperatures, a removable heating means 53 for the bearing is provided. This heating means takes the form of an open-bottomed housing 54 (whose walls are made of rigid heat-insulating material) which is adapted to rest on the top of mounting plate 4, as shown in FIG. 1, and to straddle the right-hand end of shaft 10 and the bearings 9 and 22. For this purpose, the left-hand wall 55 of housing 54 would have therein a slot (sufficient to accommodate shaft 10 and housing member 5) at the central part of this left-hand wall, this slot of course extending upwardly from the bottom edge of wall 55. Inside housing 54 are mounted four electrical cartridge heaters 56 (two of which are illustrated in FIG. 1), two at either side of test bearing 22 and two at either side of the bell portion of clamp 35, which heaters extend vertically downwardly from the top of the housing and whose lower ends are spaced slightly above the mounting plate 4 when housing 54 is in position thereon. The electrical leads 57 for the heaters extend upwardly inside a metal cover 67 to a plug 58 mounted on the top of the box 54. The heaters 56 may be energized from a suitable source of electrical power, to heat the test bearing 22 and adjacent items, such as clamp member 35, to the high temperature at which a running test is desired to be made, up to about 500° F., for example.

The operating temperature of the test bearing 22 is measured by means of a probe-type thermocouple 59 which is mounted immediately adjacent the outer race of this bearing, in a well formed by the bore of the tubular torque arm 29, and the output leads 60 of this thermocouple extend downwardly, from the sensitive portion of the thermocouple, through arm 29, out a side opening provided in this arm, and thence to equipment which measures and indicates (in terms of temperature) the voltage generated by the thermocouple.

An important feature of the testing machine of this invention is that the entire machine will fit into an environmental test chamber of modest proportions, such as one 18 inches x 18 inches x 18 inches. In such a test chamber, the machine can be run, and the bearing grease tested, at temperatures down to −65° F., or even lower, and at subatmospheric pressures, to simulate conditions in outer space. Power and instrument cables can be run through a packing gland in the environmental test chamber wall to communicate with the control equipment.

In order to measure the "start-up" torque of the test bearing, the torque sensing equipment (including the electromechanical transducer 40) previously described can be used, but for this test the shaft 10 must rotate at a much lower speed, on the order of 1 r.p.m., for example. For this test, motor 15 is de-energized, and a separate slow-speed motor 61 is utilized to drive shaft 10. A motor mounting plate 62, to which the motor 61 is bolted as at 63, is bolted to the rear face of the rear support bar 20. The axis of the output shaft 64 of motor 61 is collinear with the axis of shaft 10, and this motor output shaft is coupled to one side of a conventional releasable clutch mechanism 65, by means of which the motor output shaft may be coupled to shaft 10 so as to drive the latter directly (when so desired), at a low rate of speed. By way of example, the motor 61 may be such that its shaft 64 rotates at a speed of 1 r.p.m., when said motor is energized.

It will be understood that the so-called "running torque" test and measurement is made with clutch 65 uncoupled, motor 15 energized, and motor 61 de-energized, the shaft 10 then being driven at a high rate of speed by motor 15 operating through belt 12; the so-called "pickup" torque measurement is made with clutch 65 operative, motor 15 de-energized, and motor 61 energized, the shaft 10 then being driven directly, at a low rate of speed, by motor 61 operating through clutch 65.

The invention claimed is:

1. A machine of the character described, comprising a shaft mounted for rotation, means for rotating said shaft in continuous fashion through a plurality of revolutions, a ball bearing having spaced inner and outer races between which is a body of grease to be tested, said ball bearing surrounding said shaft; means rigidly securing said inner race to said shaft so that it rotates with said shaft, an elongated torque arm extending transversely to said shaft and having one end secured to said outer race; an electromechanical transducer having its sensing element mechanically coupled to the other end of said arm for providing an electrical signal indicative of the torque developed in said outer race, by viscous drag through said grease, as said inner race rotates; and means for applying a predetermined longitudinally-directed force to said other end of said torque arm, thereby to radially load said bearing.

2. Machine according to claim 1, including also means for applying a predetermined linear force to said outer race in a direction substantially parallel to the axis of said shaft, thereby to axially load said bearing.

References Cited

UNITED STATES PATENTS

| | | | |
|---|---|---|---|
| 1,117,187 | 11/1914 | Hess | 73—9 |
| 2,785,566 | 3/1957 | Mims | 73—9 |
| 3,009,351 | 11/1961 | Moyer | 73—10 |
| 3,027,749 | 4/1962 | Barnard | 73—9 |
| 3,041,869 | 7/1962 | Knudsen | 73—9 |
| 3,225,587 | 12/1963 | Gordon | 73—9 |

LOUIS R. PRINCE, *Primary Examiner.*

J. NOLTON, *Assistant Examiner.*